H. W. BAUER.
COMBINATION PROVISION AND EXTENSIBLE TABLE CHEST.
APPLICATION FILED SEPT. 30, 1912.
1,109,734.
Patented Sept. 8, 1914.
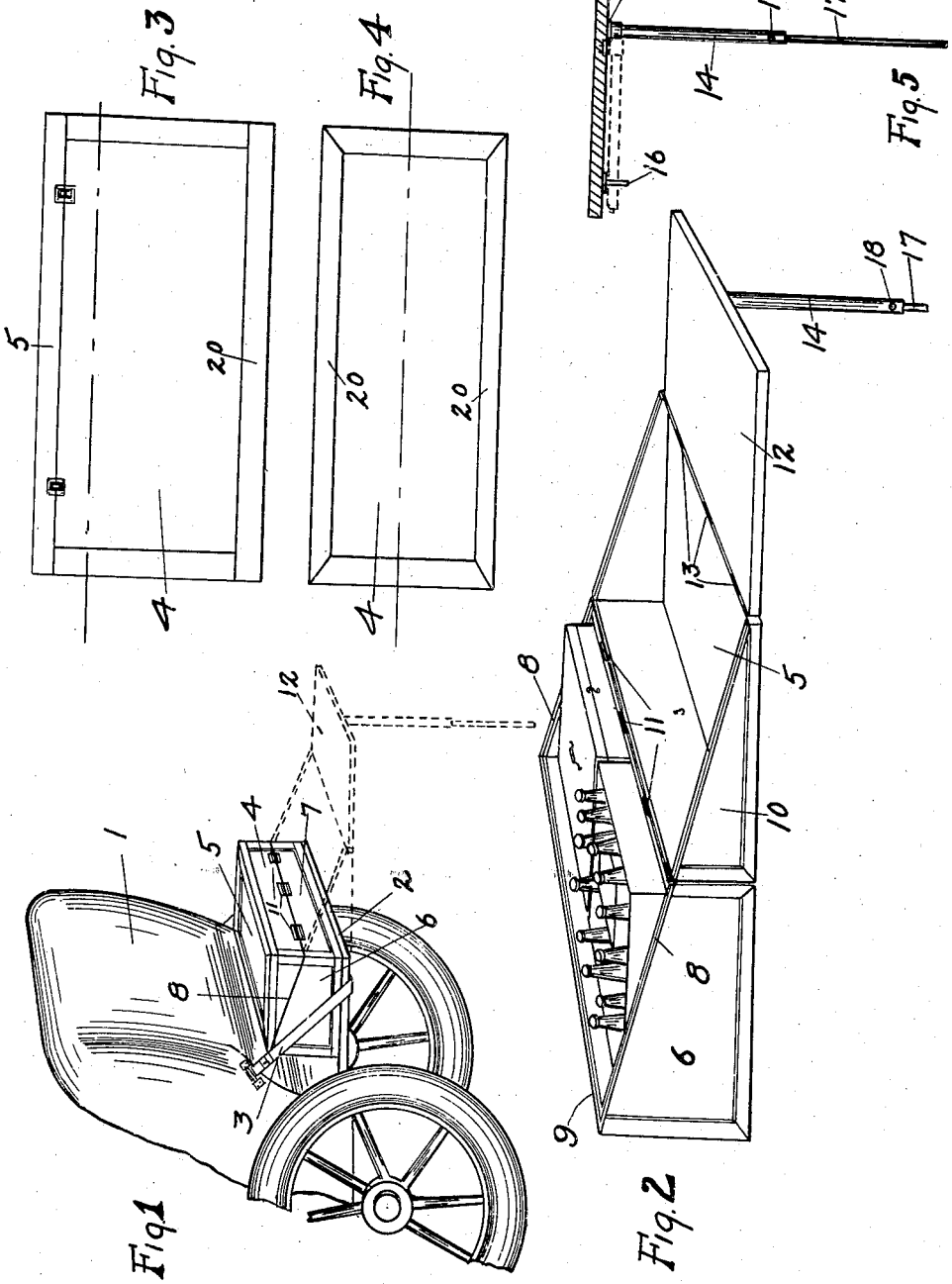
WITNESSES
Harold C. Scantlebury
Paul B. Warren
Harvey Wymant Bauer
INVENTOR
BY
Herbert E. Smith
his ATTORNEY

UNITED STATES PATENT OFFICE.

HARVEY WYNANT BAUER, OF SPOKANE, WASHINGTON.

COMBINATION PROVISION AND EXTENSIBLE-TABLE CHEST.

1,109,734.

Specification of Letters Patent. Patented Sept. 8, 1914.

Application filed September 30, 1912. Serial No. 723,190.

*To all whom it may concern:*

Be it known that I, HARVEY W. BAUER, a citizen of the United States, residing at No. 1202 East Indiana avenue, in the city of Spokane, county of Spokane, State of Washington, have invented new and useful Improvements in Combination Provision and Extensible-Table Chests, of which the following is a specification.

My invention relates to an improved form of combination provision chest with an extensible table portion thereon and is especially adapted for use when making trips in automobiles or carriages where it is desired to partake of luncheon at places remote from the usual conveniences.

One of the objects of my invention is to provide a provision chest with an improved form of cover adapted to serve as an extension table when the cover is opened, and adapted when the cover is closed, to be folded within the chest so that the latter will have the appearance of a simple form of box.

My invention will be more fully described in connection with the accompanying drawings and will be more particularly pointed out in and by the appended claims.

In the drawings:—Figure 1 is a perspective view of the rear end of an automobile showing the device of my invention applied thereto. Fig. 2 is a perspective view of the provision chest with the extension cover in an open position. Fig. 3 is a rear view of the chest and, Fig. 4 is a top view thereof. Fig. 5 is a sectional view of the extension portion of the cover showing the means for supporting the same.

Like characters of reference designate similar parts throughout the different figures of the drawing.

Describing my invention in its application to an automobile, 1 designates the body of an automobile which is provided with a rearwardly projecting shelf 2 adapted to be supported in a horizontal position by a strap or the like 3.

It will be understood that I do not wish to be limited to the particular disposition of the device of my invention upon an automobile or a vehicle as the attachment merely depends upon the character and form of the vehicle.

The provision chest is designated, as a whole by 4 and may be rectangular in form when the cover or lid is in a closed position as shown in Fig. 1. The body of the chest is provided with ends and front walls 6 and 7 and the upper portions of the end wall 6 are inclined downwardly and outwardly, as at 8 while the outer or front wall 7 has parallel edges and a height somewhat reparallel edges and a height somewhat reduced with respect to the height of the retainer or back or rear wall 9. The cover 5 is provided with inclined side walls 10, corresponding to the inclination of the end walls 6, and is hinged at 11 to the wall 7, as illustrated in Fig. 2. When the cover 5 is opened the walls 10 conveniently serve as guards to prevent the goods or provisions from falling off sidewise. The cover 5 is provided with a table-like extension 12 which may be hinged to the cover 5 as indicated at 13. The extension 12 is relatively reduced in width with respect to the width of the cover 5 so that when the extension 12 is folded inwardly it will lie flat upon the cover 5 and between the walls 10 thereof. In order to effectively support the cover when in an open position as shown in Fig. 2, the wall 7 in which are placed the hinges 11 is divided substantially in the middle so that when the cover 5 is folded back in the position shown in Fig. 2, the upper portion of the wall 7 bears against the lower portion. In order to support the outer end of the extension 12, I desirably provide an extensible leg support 14 which may be hinged to the under side of the extension 12 as indicated at 15 in Fig. 5. A suitable form of clip 16 may serve to hold the leg in a folded position as indicated in dotted lines in Fig. 5. In order to compensate for irregular ground surfaces and to insure a firm support for the leg 14, I desirably make the same extensible by providing the same with a rod 17 and making the part 14 tubular so that the rod 17 can telescope the tubular part 14. A suitable nut or fastening device 18 may serve to lock the rod 14 after the same is extended or contracted in a manner to firmly engage the ground. Furthermore, the extensible feature serves to permit contraction of the leg so that when the same is folded as shown in dotted lines, in Fig. 5, it will not extend beyond the extension table part 12.

While I have herein shown and described one specific embodiment of my invention, I do not wish to be limited thereto except for such limitations as the claims may import.

I claim:—

1. A provision chest comprising in combination, a body, a covering for said body including a lid, hinges for connecting said cover to said body, an extension leaf hinged to the edge of said lid farthest removed from said hinges, said extension leaf being adapted to fold flat against said lid when said cover is closed, and an extensible leg pivoted to said leaf near the edge thereof which is farthest from the connection of the leaf with the lid, said leg being adapted to fold against the side of said leaf which is out of contact with said lid when the leaf is folded.

2. A provision chest comprising in combination, a body, said body being provided with oppositely sloping side walls and having front and rear walls of which the front wall has the lesser height, a cover hinged to said front wall having a lid and also two side members adapted to complete a substantially rectangular configuration in combination with said body when said cover is closed, an extensible leaf hinged to said lid at the edge thereof farthest removed from the point of connection between the cover and the body of the box, said leaf being adapted to form a substantially uninterrupted surface with said lid when in its extended position, and means for supporting said leaf when in an extended position.

In testimony whereof I affix my signature in the presence of two witnesses.

HARVEY WYNANT BAUER.

Witnesses:
 HAROLD E. SCANTLEBURY,
 PAUL B. WARREN.